April 21, 1970   R. L. RATLIFF   3,507,298
DUAL RELIEF AND PRESSURE REGULATING VALVE ASSEMBLY
Filed April 25, 1968   3 Sheets-Sheet 1

INVENTOR
RICHARD L. RATLIFF
BY *Robert H. Johnson*
ATTORNEY

April 21, 1970   R. L. RATLIFF   3,507,298
DUAL RELIEF AND PRESSURE REGULATING VALVE ASSEMBLY
Filed April 25, 1968   3 Sheets-Sheet 2
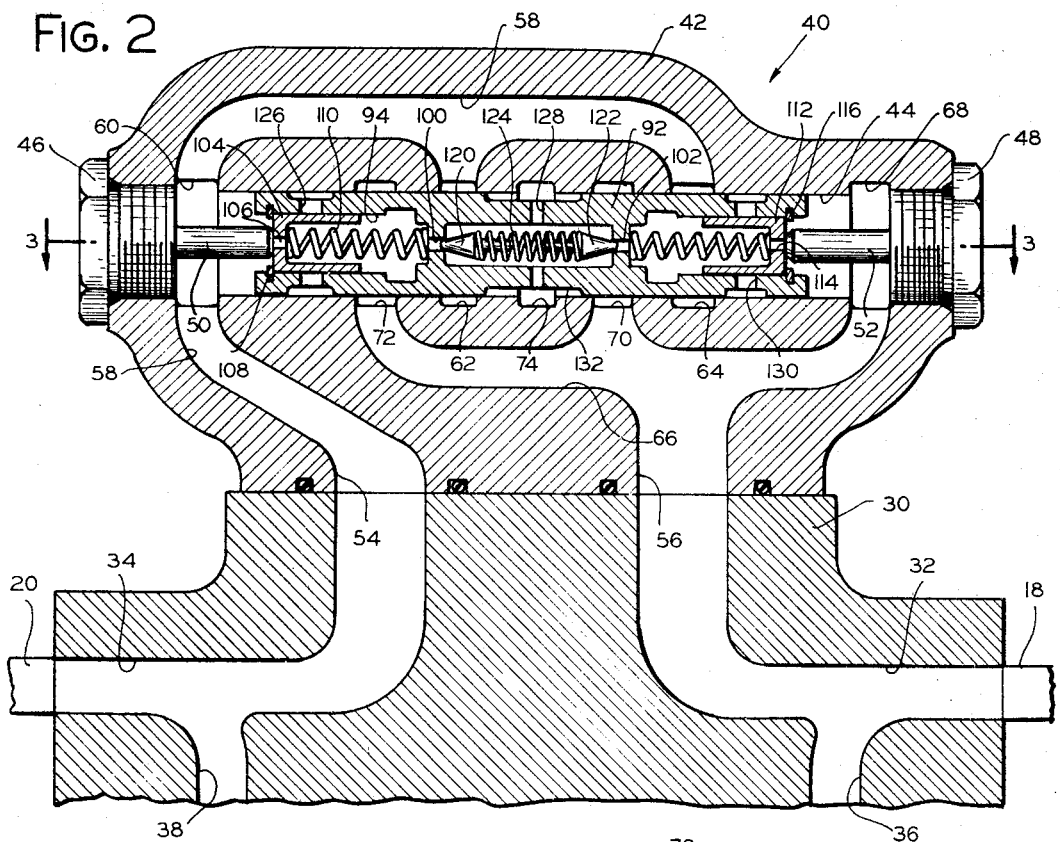
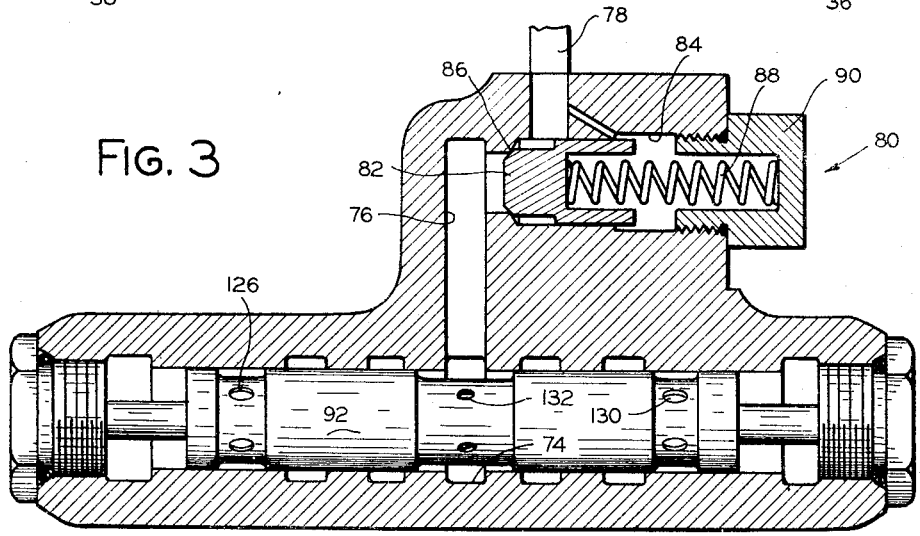
INVENTOR
RICHARD L. RATLIFF
BY *Robert H. Johnson*
ATTORNEY April 21, 1970

R. L. RATLIFF 3,507,298

DUAL RELIEF AND PRESSURE REGULATING VALVE ASSEMBLY

Filed April 25, 1968

INVENTOR
RICHARD L. RATLIFF
BY Robert H Johnson
ATTORNEY

United States Patent Office 3,507,298
Patented Apr. 21, 1970

3,507,298
DUAL RELIEF AND PRESSURE REGULATING VALVE ASSEMBLY
Richard L. Ratliff, Jackson, Mich., assignor to Clark Equipment Company, a corporation of Michigan
Filed Apr. 25, 1968, Ser. No. 724,028
Int. Cl. G05d 7/01, 11/03
U.S. Cl. 137—106     2 Claims

ABSTRACT OF THE DISCLOSURE

A reversible closed circuit hydrostatic drive system with a dual relief valve and regulating valve assembly disposed in the closed circuit.

BACKGROUND OF THE INVENTION

The field of art to which this invention relates includes fluid handling, and more specifically line condition responsive valves.

A principal object of my invnetion is to provide a dual relief and pressure regulating valve assembly that is compact and inexpensive.

SUMMARY OF THE INVENTION

In carrying out my invention in a preferred embodiment there is provided a body with a bore and first and second ports communicating with the bore. A spool is slidably disposed in the bore, and disposed in the spool are first and second relief valves. The spool is responsive to a fluid pressure differential between the ports and operative to connect the port with the higher pressure to one of the relief valves so that when a predetermined pressure is reached the one relief valve will open and bypass fluid to the port with the lower pressure.

The above and other objects, features and advantages of my invention will be more readily understood when the detailed description is considered in conjunction with the drawing.

BRIEF DESCRIPTION OF THE DRAWING

FIGURE 2 is a longitudinal section of the valve assembly in a neutral condition, FIGURE 3 is a longitudinal section taken on a plane rotated 90° from the section shown in FIG. 2.

DESCRIPTION OF THE PREFERRED EMBODIMENT

Figure 1:
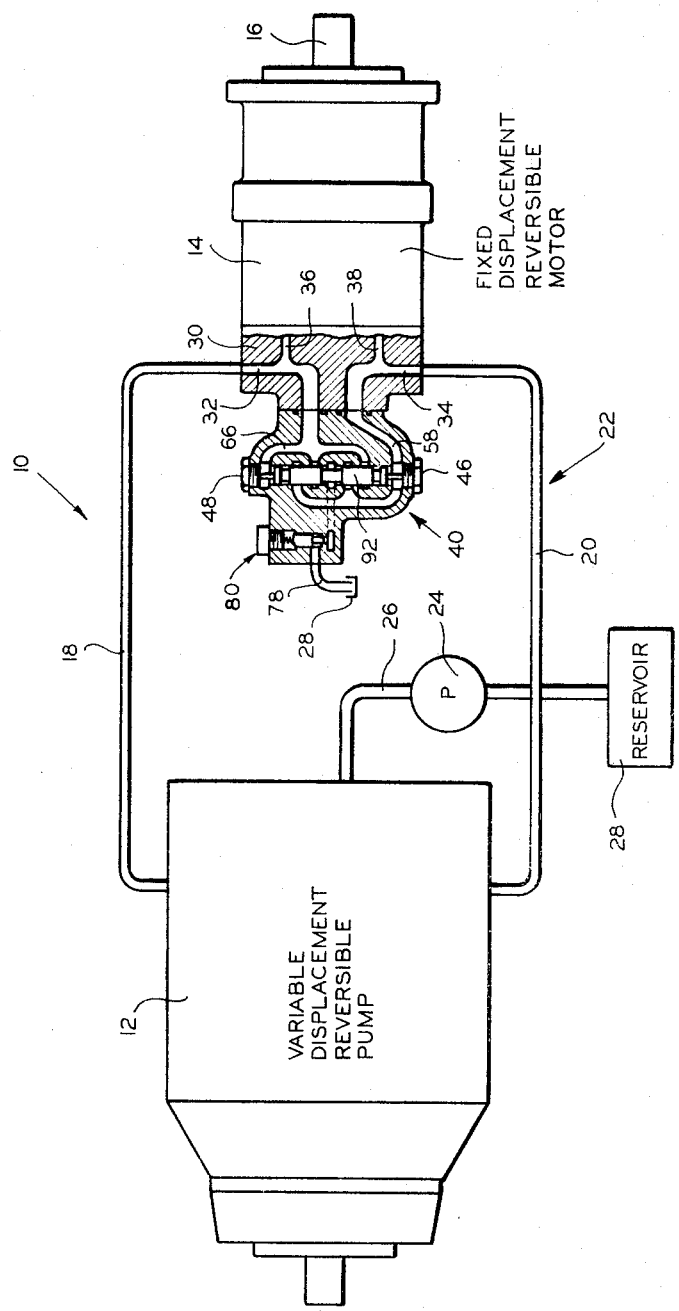
FIGURE 1 is a schematic diagram of a closed circuit hydrostatic drive system embodying my invention.
Figure 4:
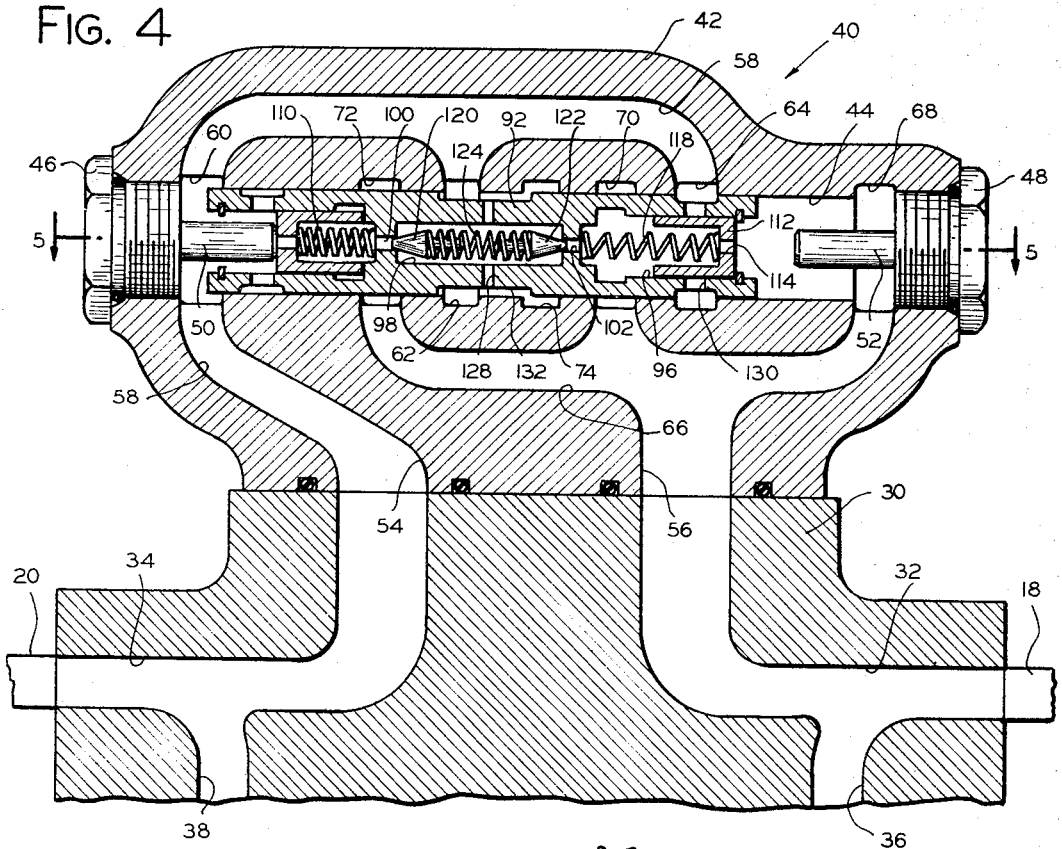
FIGURE 4 is similar to FIG. 2, except the spool has been shifted to one extreme position.
Figure 5:
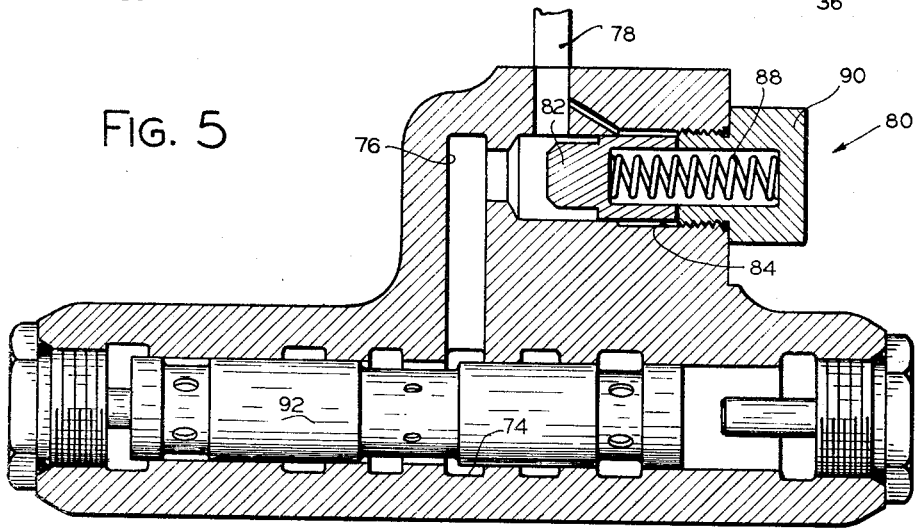
FIGURE 5 is similar to FIG. 3, except that the spool has been shifted to the same position as shown in FIG. 4.

Referring now to FIG. 1, the reference numeral 10 denotes generally a hydrostatic drive system including a variable displacement reversible pump 12 adapted to be driven by a prime mover, not shown, and a fixed displacement reversible motor 14 which is adapted to have the output shaft 16 thereof connected to the differential of a drive axle, not shown, for example. Pump 12 and motor 14 are connected by means of a pair of fluid conduits 18 and 20 which form a closed fluid circuit 22. System 10 also includes a charging pump 24 which is disposed in a fluid conduit 26 that is connected at one end to a reservoir 28 and at the other end thereof to circuit 22. The function of charging pump 24 is to maintain circuit 22 filled with fluid.

Pump 12 may be controlled by an operator so that pressurized fluid is supplied either to conduit 18 or to conduit 20, the other one of the conduits being connected to the inlet side of pump 12. Thus, for one direction of rotation of motor 14 pressurized fluid will be supplied to conduit 18 and for the other direction of rotation of motor 14 pressurized fluid will be supplied to conduit 20. As described thus far system 10 is conventional and well-known in the art.

Fluid motor 14 includes a junction block 30 with fluid passages 32 and 34 located therein. Connected to one end of fluid passage 32 is conduit 18 and connected to one end of passage 34 is conduit 20. Also, a fluid passage 36 is connected to fluid passage 32 at one end thereof and is connected at the other end thereof to one side of motor 14 and a fluid passage 38 is connected at one end thereof to fluid passage 34 and at the other end thereof to the other side of motor 14.

Connected to junction block 30, as shown, is a valve assembly 40 which serves to connect whichever one of conduits 18 and 20 is supplied with pressurized fluid to a relief valve and to connect the other one of conduits 18 and 20 to a fluid pressure regulating valve 80.

Referring now also to FIGS. 2 through 5, valve assembly 40 inculdes a body 42 which is connected to junction block 30 by any suitable means, preferably machine screws. Extending longitudinally of body 42 is a bore 44, the ends of which are closed by a pair of threaded plugs 46 and 48. Connected to plugs 46 and 48, respectively, are longitudinally inwardly extending projections 50 and 52, the purpose of which will be explained hereinafter.

Located in body 42 are a pair of ports 54 and 56 which register with the ends of fluid passages 34 and 32, respectively, as shown. A fluid passage 58 connects port 54 with bore 44 at openings 60, 62 and 64. Similarly, a fluid passage 66 connects port 56 with bore 44 at openings 68, 70 and 72. Also communicating with bore 44 at an opening 74 is a fluid passage 76 which is connected to a conduit 78 that leads back to reservoir 28. Disposed in fluid passage 76 is pressure regulating valve 80 which blocks fluid flow through passage 76 until a predetermined fluid pressure is reached.

Regulating valve 80 includes a piston 82 slidably disposed in a bore 84 in housing 42 and biased into sealing engagement with a shoulder 86 in fluid passage 76 by means of a compression spring 88 disposed in bore 84 and held in place by means of a threaded cap 90.

Slidably disposed in bore 44 is a spool 92 which includes a pair of bores 94 and 96 that extend inwardly from opposite ends thereof. Located intermediate bores 94 and 96 is a chamber 98. A fluid passage 100 communicates chamber 98 with bore 94 and a fluid passage 102 communicates chamber 98 with bore 96.

Slidably disposed in bore 94 is a piston 104 which has an opening 106 therein. Piston 104 is retained in bore 94 by means of a retainer ring 108 and is biased outwardly into abutment with ring 108 by means of a spring 110 disposed in bore 94, as shown. A piston 112 is slidably disposed in bore 96 and has an opening 114 therein. Piston 112 is retained in bore 96 by means of a retainer ring 116 and is biased outwardly into abutment with ring 116 by means of a spring 118. At this point it will be noted that pistons 104 and 112 abut projections 50 and 52, respectively, when spool 92 is in its centered position, and so tend to maintain spool 92 in its centered position.

Disposed in chamber 98 are a pair of poppet valves 120 and 122 which are biased into sealing engagement with the adjacent ends of fluid passages 100 and 102 by means of a compression spring 124.

Spool 92 includes a plurality of fluid passages 126 which connect the outer periphery thereof with bore 94, a plurality of fluid passages 128 which connect the outer periphery thereof with chambers 98 and a plurality of fluid passages 130 which connect the outer periphery thereof with bore 96.

In order to enable persons skilled in the art to better understand my invention, I will now explain the operation of it. First, it will be assumed that the hydrostatic drive system 10 is a neutral condition. That is, pressurized fluid is being supplied to neither conduit 18 nor conduit 20. In this condition of operation valve assemby 40 is in the condition shown in FIGS. 2 and 3, spool 92 being centered so that fluid communication between fluid passages 32 and 34 via valve assembly 40 is blocked.

Now it will be assumed that drive system 10 is condition to drive motor 14 in such a diretcion that conduit 18 is supplied with pressurized fluid from pump 12 and conduit 20 is connected to the inlet side of pump 12. Under this condition of operation pressurized fluid is supplied to port 56, and hence to bore 44 through opening 68 adjacent the right hand end of spool 92. As a result, spool 92 is shifted toward the left to the position shown in FIGS. 4 and 5. With spool 92 shifted to the position shown in FIG. 4 opening 62 in fluid passage 58 is placed in communication with fluid passage 128 and opening 64 is placed in communication with fluid passages 130. At the same time fluid passage 76 is placed in communication with fluid passage 58 via openings 62 and 74 and groove 132. At this point it will be evident that the maximum pressure which can be maintained in conduit 20 is controlled by regulating valve 80 since it is connected to conduit 20 via fluid passages 34, 58 and 76 through valve assembly 40. Also, it will be noted that should the pressure in conduit 18 increase above a predetermined level that the relief valve which includes piston 112 and poppet valve 122 will be actuated to open, and thus by-pass fluid from fluid passage 32 to fluid passage 34 through valve assembly 40. More specifically, when the fluid pressure in fluid passage 32, and hence in bore 96 reaches a predetermined level poppet valve 122 will be forced to move the left against the bias of spring 124 with the result that fluid will now be permitted to flow through passage 102 into chamber 98 and from there to fluid passage 34 via passages 128, opening 62 and fluid passage 58. The flow of fluid out of bore 96 due to the opening of poppet valve 122 causes a pressure drop in bore 96 because fluid cannot flow into bore 96 through opening 114 as fast as it flows out through fluid passage 102. Consequently, piston 112 is quickly shifted to the left against the bias of spring 118 and uncovers fluid passages 130 so that fluid can now flow directly from bore 44 through fluid passages 130 into fluid passage 58 via opening 64 and hence into fluid passage 34.

Because valve assembly 40 is symmetric, it will function in the same manner if pressurized fluid is supplied to conduit 20 and conduit 18 is connected to the inlet of pump 12. In this case spool 92 simply shifts to the right so that poppet valve 120 and piston 104 function as the relief valve to by-pass excessive pressure fluid from fluid passage 34 to 32 via valve assembly 40 and connect fluid passage 32 to regulating valve 80.

At this point it will be seen that I have provided a very compact valve assembly which functions to always connect the high pressure sides of two conduits to a relief valve while connecting the low pressure side of the two conduits to a regulating valve.

While I have described only a single embodiment of my invention, it will be understood that this description is intended to be illustrative only, and that various modications and changes can be made to my invention without departing from the spirit and scope of it.

What is claimed is:

1. A valve assembly comprising an elongated body, the said body having a first longitudinally extending bore therein, first and second ports in the said body, a first fluid passage connected to the said first port and including first, second and third longitudinally spaced apart openings communicating with the said first bore, a second fluid passage connected to the said second port and including fourth, fifth and sixth longitudinally spaced apart openings communicating with the said first bore, the said fourth opening being located longitudinally outwardly of the said third opening, the said fifth opening being located between the said second and third openings and the said sixth opening being located between the said first and second openings, a spool slidably disposed in the said first bore, the said spool including second and third bores extending longitudinally inwardly from opposite ends thereof, a chamber located between the said second and third bores, a third fluid passage connecting the said chamber and second bore and a fourth fluid passage connecting the said chamber and third bore, fifth, sixth and seventh fluid passages connecting the outer spool periphery with the said second bore, the said chamber and the said third bore, respectively, the said fifth, sixth and seventh fluid passages and the said second, third, fifth and sixth openings being located so that when the said spool is in a centered position communication between the said second, third, fifth and sixth openings and the said fifth, sixth and seventh fluid passages is blocked, when the said spool is shifted in one direction the said fifth opening is placed in communication with the said sixth fluid passage and the said sixth opening is placed in communication with the said fifth fluid passage and when the said spool is shifted in the opposite direction the said second opening is placed in communication with the said sixth fluid passage and the said third opening is placed in communication with the said seventh fluid passage, a first piston slidably disposed in the said second bore, the said first piston including a seventh opening, a first spring disposed in the said second bore for biasing the said first piston outwardly, a second piston slidably disposed in the said third bore, the said second piston including an eighth opening, a second spring disposed in the said third bore for biasing the said second piston outwardly, first and second poppet valves disposed in the said chamber and a third spring disposed between the said first and second poppet valves for biasing them into sealing relation with the said third and fourth fluid passages, respectively.

2. A valve assembly as set forth in claim 1 and including an eighth fluid passage disposed in the said body and connected to the said bore between the said second and fifth openings and a fluid pressure regualting valve disposed in the said eighth fluid passage.

References Cited

FOREIGN PATENTS 737,678   9/1955   Great Britain.

ALAN COHAN, Primary Examiner

H. M. COHN, Assistant Examiner

U.S. Cl. X.R.

91—420, 452; 137—114